(12) United States Patent
Sato et al.

(10) Patent No.: US 10,268,009 B2
(45) Date of Patent: Apr. 23, 2019

(54) OPTICAL FIBER CABLE

(71) Applicant: Sumitomo Electric Industries, Ltd., Osaka-shi, Osaka (JP)

(72) Inventors: Fumiaki Sato, Yokohama (JP); Kenta Tsuchiya, Yokohama (JP); Keisuke Okada, Yokohama (JP); Yoshiaki Nagao, Yokohama (JP); Nobuyuki Suzuki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/771,642

(22) PCT Filed: Jan. 26, 2017

(86) PCT No.: PCT/JP2017/002814
§ 371 (c)(1),
(2) Date: Apr. 27, 2018

(87) PCT Pub. No.: WO2017/131118
PCT Pub. Date: Aug. 3, 2017

(65) Prior Publication Data
US 2018/0321453 A1    Nov. 8, 2018

(30) Foreign Application Priority Data
Jan. 28, 2016   (JP) .................................. 2016-014480

(51) Int. Cl.
*G02B 6/44*    (2006.01)
(52) U.S. Cl.
CPC ............. *G02B 6/4403* (2013.01); *G02B 6/44* (2013.01); *G02B 6/441* (2013.01); *G02B 6/4407* (2013.01); *G02B 6/4489* (2013.01); *G02B 6/443* (2013.01)

(58) Field of Classification Search
CPC ..... G02B 6/4403; G02B 6/4407; G02B 6/441; G02B 6/443; G02B 6/4489
See application file for complete search history.

(56) References Cited

U.S. PATENT DOCUMENTS

| 5,136,673 A | * | 8/1992 | Yoshizawa | G02B 6/4408 |
| | | | | 385/103 |
| 6,122,427 A | * | 9/2000 | Yokokawa | G02B 6/4408 |
| | | | | 385/110 |

(Continued)

FOREIGN PATENT DOCUMENTS

| JP | H07-146426 A | 6/1995 | |
| JP | 2003241037 A | * 8/2003 | ............... G02B 6/44 |

(Continued)

*Primary Examiner* — Daniel Petkovsek
(74) *Attorney, Agent, or Firm* — Drinker Biddle & Reath LLP

(57) ABSTRACT

An optical fiber cable comprises optical units having a plurality of optical fiber ribbons, a slot rod having a plurality of slot grooves in which the optical units are accommodated, and a cable sheath configured to cover an outer side of the slot rod, each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, and an outer diameter of the optical fiber cable is 35 mm or less and a number of the optical fibers in the optical unit accommodated in one slot groove is 100 or more.

3 Claims, 2 Drawing Sheets

(56) References Cited

U.S. PATENT DOCUMENTS

| | | | | |
|---|---|---|---|---|
| 6,304,701 B1* | 10/2001 | Bringuier | ............. | G02B 6/4494 |
| | | | | 385/100 |
| 9,618,717 B2* | 4/2017 | Ito | ......................... | G02B 6/4405 |
| 2006/0120676 A1* | 6/2006 | Kang | .................... | G02B 6/4408 |
| | | | | 385/105 |
| 2011/0110635 A1* | 5/2011 | Toge | .................... | G02B 6/4403 |
| | | | | 385/102 |
| 2012/0189257 A1* | 7/2012 | Kasahara | ............... | C03C 25/106 |
| | | | | 385/114 |
| 2017/0115451 A1* | 4/2017 | Sajima | ..................... | G02B 6/04 |

FOREIGN PATENT DOCUMENTS

| | | | | | |
|---|---|---|---|---|---|
| JP | 2010-8923 A | | 1/2010 | | |
| JP | 2014-211511 A | | 11/2014 | | |
| JP | 2015-52692 A | | 3/2015 | | |
| JP | 2015-99314 A | | 5/2015 | | |
| JP | 2015099315 A | * | 5/2015 | ............... | G02B 6/44 |
| JP | 2015-215447 A | | 12/2015 | | |
| JP | 2016177138 A | * | 10/2016 | ............... | G02B 6/44 |

\* cited by examiner

OPTICAL FIBER CABLE

TECHNICAL FIELD

The present invention relates to an optical fiber cable.

The subject application claims priority from Japanese Patent Application No. 2016-014480 filed on Jan. 28, 2016, the entire contents of which are incorporated herein by reference.

BACKGROUND ART

Patent Document 1 discloses an optical fiber cable including a plurality of optical fiber ribbons, each of which has a plurality of optical fibers arranged in parallel, a slot rod having a plurality of SZ-shaped slot grooves for accommodating therein one or more the optical fiber ribbons, an upper wrapping tape wrapped around the slot rod, and a sheath configured to cover an outer side of the slot rod covered with the upper wrapping tape. Patent Document 2 discloses a slot-less type optical fiber cable with no slot rod.

CITATION LIST

Patent Documents

Patent Document 1: JP-A-2014-211511
Patent Document 2: JP-A-2010-8923

SUMMARY OF THE INVENTION

An optical fiber cable of an aspect of the present disclosure is an optical fiber cable includes:
optical units having a plurality of optical fiber ribbons,
a slot rod having a plurality of slot grooves in which the optical units are accommodated, and
a cable sheath configured to cover an outer side of the slot rod,
wherein each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, and
wherein an outer diameter of the optical fiber cable is 35 mm or less and a number of the optical fibers in the optical unit accommodated in one slot groove is 100 or more.

DETAILED DESCRIPTION OF ILLUSTRATIVE EMBODIMENTS

Figure 1:
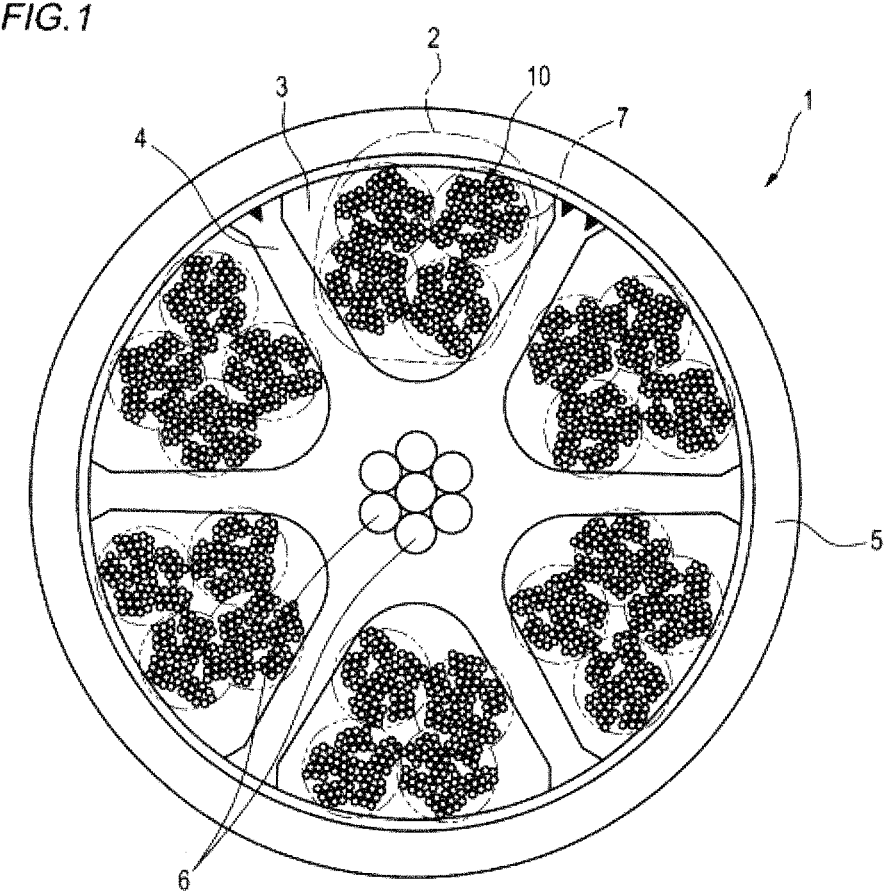
FIG. 1 is a sectional view depicting an example of an optical fiber cable in accordance with an aspect of the present disclosure.

Problems to be Solved by the Present Disclosure

A slot-less type optical fiber cable does not include a slot rod, so that it is possible to increase a density of optical fibers to be accommodated, as compared to a slot type optical fiber cable. However, as the number of the optical fibers increases, there is a problem in distinguishability of distinguishing optical fiber ribbons when taking out the optical fiber ribbons upon intermediate branching of the optical fiber cable, for example.

In contrast, according to the slot type optical fiber cable, since it is possible to take out the optical fiber ribbons from each slot groove, the distinguishability of the optical fiber ribbons is improved. However, since a member for forming the slot rod occupies a space in the cable, it is difficult to implement the high-density packing.

It is therefore an object of the present disclosure to provide an optical fiber cable capable of packing optical fibers in a high density in a slot type multicore optical fiber cable.

Effects of the Present Disclosure

According to the present disclosure, it is possible to pack optical fibers in a high density in a slot type multicore optical fiber cable.

Description of Illustrative Embodiment of the Present Invention

First, an illustrative embodiment of the present invention is described.

An optical fiber cable in accordance with an illustrative embodiment of the present invention is:
(1) An optical fiber cable includes:
optical units having a plurality of optical fiber ribbons,
a slot rod having a plurality of slot grooves in which the optical units are accommodated, and
a cable sheath configured to cover an outer side of the slot rod,
wherein each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, and
wherein an outer diameter of the optical fiber cable is 35 mm or less and a number of the optical fibers in the optical unit accommodated in one slot groove is 100 or more.

In the optical fiber cable of the above (1), the optical fiber ribbon is an intermittent coupling type in which the coupling portions and the non-coupling portions are intermittently provided. Therefore, when the optical fiber cable is bent, it is possible to relieve strain generated in the optical fiber ribbon, so that it is possible to prevent transmission characteristics from being deteriorated. Since the optical unit is configured by integrating the plurality of the intermittent coupling type optical fiber ribbons, it is possible to pack the optical fibers in a high density without deteriorating the transmission characteristics, so that the number of the optical fibers in the optical unit accommodated in one slot groove can be set to 100 or more even when an outer diameter of the optical fiber cable is 35 mm or less. Accordingly, it is possible to pack the optical fibers in a high density in the slot type multicore optical fiber cable of which the optical fiber ribbons are favorably distinguished.

(2) A density of the optical fibers included in the optical fiber cable is equal to or higher than 2.4 fibers/mm$^2$ in a section of the optical fiber cable.

The intermittent coupling type optical fiber ribbon is used, so that it is possible to set the density of the optical fibers included in the optical fiber cable to 2.4 fibers/mm$^2$ or higher in the section of the optical fiber cable. Accordingly, it is possible to pack the multiple optical fibers in a high density even in the slot type optical fiber cable.

(3) The optical units have a plurality of sub-units in which the optical fiber ribbons are stranded, respectively.

Since the optical fiber ribbons are accommodated with being stranded for each sub-unit, it is possible to improve the distinguishability when taking out the optical fiber ribbons.

(4) The sub-units are respectively wound with a bundle material thereon.

Since the sub-unit is wound thereon with the distinguishable bundle material, it is possible to easily distinguish the sub-unit.

DETAILS OF ILLUSTRATIVE EMBODIMENT OF THE PRESENT INVENTION

A specific example of the optical fiber cable in accordance with the illustrative embodiment of the present invention will be described with reference to the drawings.

In the meantime, the present invention is not limited to the example, is defined in the claims, and includes all changes within a meaning and a range equivalent to the claims.

Figure 2:
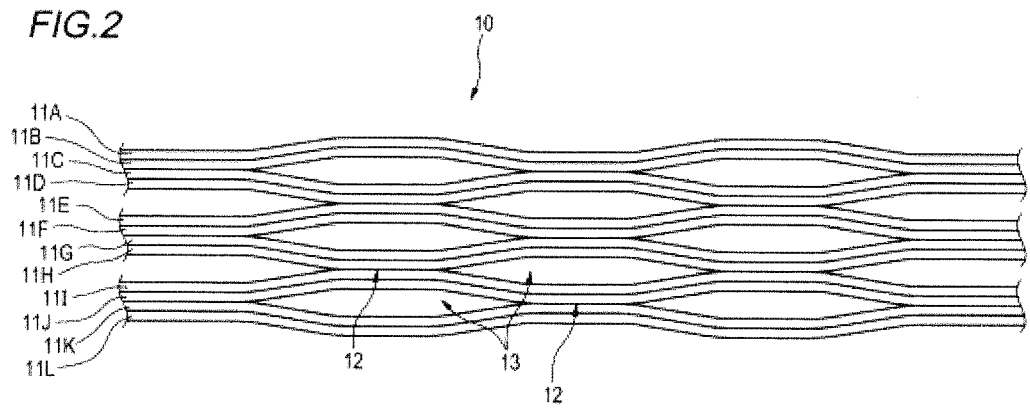
FIG. 2 is a plan view of an intermittent coupling type optical fiber ribbon of 12 fibers.
Figure 3:
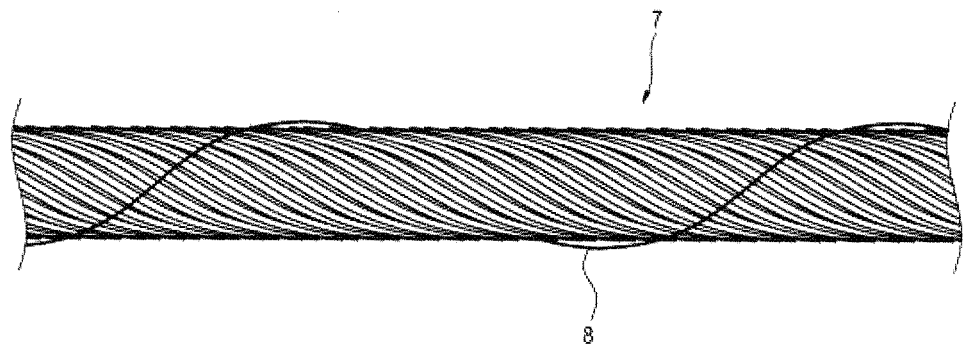
FIG. 3 is a pictorial view of a sub-unit of an optical unit of the optical fiber cable in accordance with the aspect of the present disclosure.

FIG. 1 is a sectional view depicting an example of an optical fiber cable in accordance with an aspect of the present disclosure. FIG. 2 is a plan view of an intermittent coupling type optical fiber ribbon of 12 fibers. FIG. 3 is a pictorial view of a sub-unit of an optical unit of the optical fiber cable in accordance with the aspect of the present disclosure.

As shown in FIG. 1, an optical fiber cable 1 includes optical units 2 (assembly of sub-units 7), a slot rod 4 having a plurality of slot grooves 3 in which the optical units 2 are accommodated, and a cable sheath 5 configured to cover an outer side of the slot rod 4.

The slot rod 4 has a structure where tension members 6 are provided at a central part thereof and the plurality of slot grooves 3 (six, in the example of FIG. 1) is radially arranged at an outer surface-side by unidirectional stranding or SZ stranding.

The optical unit 2 has a plurality of optical fiber ribbons 10.

As shown in FIG. 2, the optical fiber ribbon 10 has a plurality of (12, in the example of FIG. 2) optical fibers 11A to 11L arranged in parallel. Each of the optical fibers 11A to 11L is a coated optical fiber of a single fiber. In the meantime, the optical fibers 11A to 11L may be coated with different colors so that the optical fibers can be distinguished one another.

The optical fiber ribbon 10 is an intermittent coupling type optical fiber ribbon, and is intermittently provided with coupling portions 12, at which the adjacent optical fibers are coupled therebetween, and non-coupling portions 13, at which the adjacent optical fibers are not coupled therebetween, in a longitudinal direction in a state where the plurality of optical fibers is arranged in parallel. The portions at which the coupling portions 12 and the non-coupling portions 13 are intermittently provided may be between some of the optical fibers, as shown in FIG. 2 or between all of the optical fibers. In the example of FIG. 2, the non-coupling portion 13 is not provided between the optical fibers 11A and 11B, 11C and 11D, 11E and 11F, 11G and 11H, 11I and 11J, 11K and 11L.

The optical fiber ribbon 10 may be manufactured so that the coupling portions 12 and the non-coupling portions 13 are intermittently formed by intermittently applying a coupling resin such as ultraviolet-curable resin, thermosetting resin or the like between the optical fibers. In the meantime, as the coupling resin, a resin having an excellent peel-off property may be used so as to easily perform an operation of separating the single fibers of the optical fibers.

Alternatively, the intermittent coupling type optical fiber ribbon 10 may be manufactured by applying the coupling resin to the plurality of optical fibers 11A to 11L to couple all the optical fibers and then cutting portions of the optical fibers with a rotary blade or the like to form the non-coupling portions 13.

The optical fiber cable 1 of the illustrative embodiment has an outer diameter of 35 mm or less, and a number of the optical fibers in the optical unit 2 accommodated in one slot groove 3 is 100 or more.

In the optical fiber cable 1 of the illustrative embodiment, the optical fiber ribbon 10 is an intermittent coupling type in which the coupling portions 12, at which the adjacent optical fibers are coupled therebetween, and the non-coupling portions 13, at which the adjacent optical fibers are not coupled therebetween, are intermittently provided in the longitudinal direction. Thereby, when the optical fiber cable 1 is bent, it is possible to relieve strain generated in the optical fiber ribbon 10, so that it is possible to prevent transmission characteristics from being deteriorated. The optical unit 2 is configured by integrating the plurality of the intermittent coupling type optical fiber ribbons 10, so that the number of the optical fibers in the optical unit 2 accommodated in one slot groove 3 can be set to 100 or more without deteriorating the transmission characteristics even when the outer diameter of the optical fiber cable is 35 mm or less. Accordingly, it is possible to pack the optical fibers in a high density in the slot type multicore optical fiber cable of which the optical fiber ribbons 10 are favorably distinguished. In the meantime, the optical fiber cable 1 of the illustrative embodiment is particularly favorable to a multicore cable of 1000 fibers or more.

Also, as shown in embodiments to be described later, a density of the optical fibers to be included in the optical fiber cable 1 is preferably equal to or higher than 2.4 fibers/mm$^2$ in a section of the optical fiber cable 1. The intermittent coupling type optical fiber ribbon is used, so that it is possible to set the density of the optical fibers to 2.4 fibers/mm$^2$ or higher. Accordingly, it is possible to pack the multiple optical fibers in a high density even in the slot type optical fiber cable.

Also, the optical unit 2 may have a plurality of sub-units 7 (refer to FIG. 3) in which the optical fiber ribbons 10 are stranded. In the example of FIG. 1, the sub-unit 7 has the six stranded optical fiber ribbons 10. In this way, since the optical fiber ribbons 10 are accommodated with being stranded in each sub-unit 7, the distinguishability is improved when taking out the optical fiber ribbons 10.

Also, the sub-unit 7 may be wound thereon with a bundle material 8. The sub-unit 7 is wound thereon with the bundle material 8, so that it is possible to easily distinguish the sub-unit 7. In the meantime, the distinguishability can be further improved by changing a color of the bundle material 8.

EMBODIMENTS

Subsequently, specific embodiments of the optical fiber cable of the illustrative embodiment are described.

Figure 4:
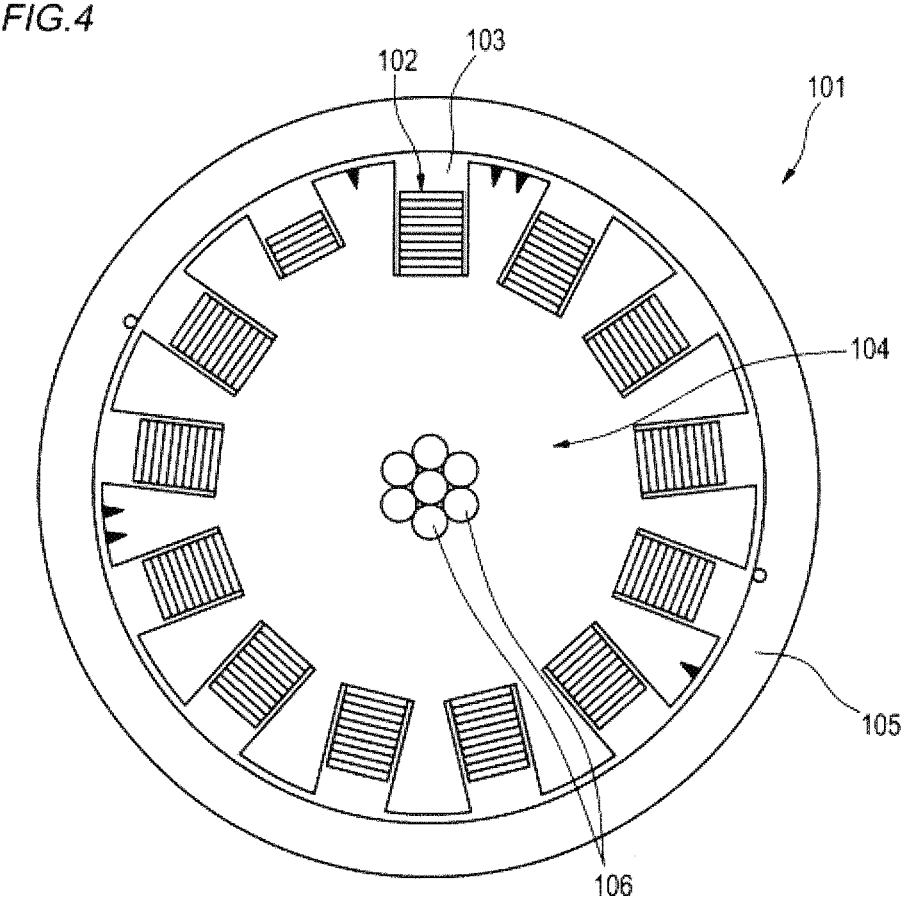
FIG. 4 is a pictorial view depicting an example of a slot type optical fiber cable of the related art.

As Embodiments 1 and 2 of a multicore cable of 1000 fibers or more, which is favorable to the optical fiber cable of the present invention, optical fiber cables based on the structure of FIG. 1 were test-produced. Also, as Comparative Example, a slot type optical fiber cable having a structure shown in FIG. 4 was test-produced. In the meantime, FIG. 4 is a pictorial view depicting an example of a slot type optical fiber cable of the related art.

Embodiment 1

The sub-unit 7 of 72 fibers was formed by stranding the six intermittent coupling type optical fiber ribbons 10 of 12 fibers shown in FIG. 2 with a strand pitch of 500 mm by a stranding equipment. Then, the sub-units 7 formed as described above were accommodated four by four in the six slot grooves 3 of the slot type optical fiber cable 1 shown in FIG. 1 by using an assembly machine, so that an optical fiber cable of 1728 fibers was manufactured. In the meantime, the stranding of the optical fiber ribbons 10 and the accommodating thereof into the slot grooves 3 may be performed in the same process. Also, the stranding direction of the slot grooves 3 may be unidirectional stranding or SZ stranding.

Embodiment 2

In Embodiment 2, an optical fiber cable of 3456 fibers was manufactured by the same method as Embodiment 1, except that the sub-units 7 were accommodated eight by eight in the respective slot grooves 3.

Comparative Example

As Comparative Example, a unidirectional stranding (HL stranding) tape slot type optical fiber cable 101 of 1000 fibers shown in FIG. 4, which is the maximum multicore cable of the conventional slot type optical fiber cable, was used. In the optical fiber cable 101, a total of 125 optical fiber ribbons 102 of 8 fibers in which eight optical fibers are coupled in parallel (i.e., it is not an intermittent coupling type) are used. The optical fiber cable 101 includes a slot rod 104 having 13 slot grooves 103 in which the multiple (10 or 5) optical fiber ribbons 102 are accommodated. Also, the optical fiber cable includes a cable sheath 105 configured to cover an outer side of the slot rod 104 and tension members 106 provided at a central part. In the optical fiber cable 101, the number of the optical fibers accommodated in one slot groove 103 is 80 or less.

An outer diameter of the optical fiber cable 101 of Comparative Example is 23.5 mm, and a fiber density (a number of fibers/a sectional area of the cable) of the optical fibers per unit area of a cable section is 2.3 fibers/mm$^2$.

In contrast, a fiber density of the optical fibers per unit area of the optical fiber cable of 1728 fibers of Embodiment 1 is 3.3 fibers/mm$^2$. Also, a fiber density of the optical fibers per unit area of the optical fiber cable of 3456 fibers of Embodiment 2 is 3.8 fibers/mm$^2$.

As described above, it can be seen that it is possible to increase the fiber density of the optical fibers per unit area in the optical fiber cable 1 of Embodiments 1 and 2, as compared to the optical fiber cable 101 of the related art (Comparative Example).

In the meantime, when the fiber density of the optical fibers excessively increases, the transmission characteristics are deteriorated. Accordingly, an upper limit thereof is preferably set to about 7 fibers/mm$^2$.

In the meantime, since the optical fiber cable 101 of Comparative Example uses the coupled optical fiber ribbons, it is not possible to increase the number of fibers in one groove. Also, since the optical fiber ribbons in the slot grooves are distinguished by increasing the number of the slot grooves of the slot rod, a ratio of the slot rod occupying a space in the cable increases. For this reason, the ratio of the slot rod 104 occupying the space in the cable (slot occupying ratio) is 38.5%. In contrast, since Embodiments 1 and 2 use the intermittent coupling type optical fiber ribbons, it is possible to increase the number of fibers in one slot groove. Also, the intermittent coupling type optical fiber ribbon is easily deformed, so that it is possible to fill the slot groove with the ribbons by increasing a sectional area thereof. For this reason, the slot occupying ratio can be reduced to 25.7%. The less the slot occupying ratio is, it is possible to pack the optical fibers in a higher density. Therefore, the structure of the optical fiber cable 1 of Embodiments 1 and 2 is suitable for the high-density packing and can implement the above-described fiber density.

Also, in the optical fiber cable 1 of Embodiments 1 and 2, the optical fibers are packed in the slot groove 3 by the plurality of the sub-units 7. Therefore, as compared to a configuration where there is no sub-unit, it is possible to improve the distinguishability of the respective optical fibers.

DESCRIPTION OF REFERENCE NUMERALS

1: optical fiber cable
2: optical unit
3: slot groove
4: slot rod
5: cable sheath
6: tension member
7: sub-unit
8: bundle material
10: optical fiber ribbon
11A to 11L: optical fiber
12: coupling portion
13: non-coupling portion
101: optical fiber cable
102: optical fiber ribbon
103: slot groove
104: slot rod
105: cable sheath
106: tension member

The invention claimed is:

1. An optical fiber cable comprising:
   optical units having a plurality of optical fiber ribbons;
   a slot rod having a plurality of slot grooves in which the optical units are accommodated, and
   a cable sheath configured to cover an outer side of the slot rod,
   wherein each of the optical fiber ribbons is intermittently provided with coupling portions, at which adjacent optical fibers are coupled therebetween, and non-coupling portions, at which adjacent optical fibers are not coupled therebetween, in a longitudinal direction between a part or all of the optical fibers in a state where the plurality of optical fibers is arranged in parallel, and wherein an outer diameter of the optical fiber cable is 35 mm or less, and a number of the optical fibers in the optical unit accommodated in one slot groove is 100 or more, wherein each optical unit has a plurality of sub-units, the optical fiber ribbons being stranded in each of the sub-units.

2. The optical fiber cable according to claim 1, wherein a density of the optical fibers included in the optical fiber cable is equal to or higher than 2.4 fibers/mm$^2$ in a section of the optical fiber cable.

3. The optical fiber cable according to claim 1, wherein each sub-unit is wound with a bundle material thereon.

* * * * *